United States Patent [19]
Resta

[11] 3,896,301
[45] July 22, 1975

[54] SOLID STATE DC TIMES AC MULTIPLIER
[75] Inventor: Vincent A. Resta, Lauderdale Lakes, Fla.
[73] Assignee: The Bendix Corporation, Southfield, Mich.
[22] Filed: Jan. 11, 1974
[21] Appl. No.: 432,731

[52] U.S. Cl. .............................. 235/194; 307/229
[51] Int. Cl.² .......................................... G06G 7/16
[58] Field of Search ...... 235/186, 189, 194, 150.26, 235/150.27; 307/229; 328/160, 161; 323/21

[56] References Cited
UNITED STATES PATENTS
| | | | |
|---|---|---|---|
| 3,193,672 | 7/1965 | Azgapetian | 235/194 |
| 3,215,824 | 11/1965 | Alexander et al. | 235/194 X |
| 3,283,135 | 11/1966 | Sklaroff | 235/194 |
| 3,384,739 | 5/1968 | Connelly | 235/194 |
| 3,448,297 | 6/1969 | Rhodes | 235/194 X |

Primary Examiner—Joseph F. Ruggiero
Attorney, Agent, or Firm—W. G. Christoforo; Bruce L. Lamb

[57] ABSTRACT

A d.c. times a.c. multiplier utilizes the essentially pure resistive characteristics of a photocell, such as a cadmium sulfide photocell, to allow a.c. and d.c. component signals to be applied to the multiplier without interaction. The product is fed back as one input to an integrator, which essentially acts as a low pass filter, while the d.c. multiplicand is applied as a second input thereto. The integrator output controls the relative light output of a pair of serially connected light emitting diodes which are light coupled respectively to a pair of serially connected photocells which determine the gain of the a.c. multiplicand.

11 Claims, 3 Drawing Figures 3,896,301

SOLID STATE DC TIMES AC MULTIPLIER

BACKGROUND OF THE INVENTION

This invention relates to multiplying circuits and more particularly to such circuits which multiply a.c. signals by d.c. signals through the use of pure resistive elements. The invention additionally relates to circuits for combining aircraft omni bearing (VOR) information with aircraft compass heading information to produce relative bearing signals for aircraft radio magnetic indicators (RMI) which are in common usage.

In older generation navigational units the combination of VOR information with compass heading information was normally accomplished by expensive electromechanical assemblies which function as relative bearing computers. Currently available semiconductor devices permit a solid state equivalent to the relative bearing computer to be produced with some size and cost savings.

SUMMARY OF THE INVENTION

In spite of the aforementioned size and cost savings which were available by the use of known semiconductor units to produce an equivalent of a solid state relative bearing computer, the applicant herein has invented a new solid state multiplier suitable for use in an aircraft relative bearing computer which, in addition, permits still further cost savings with improved performance. This has been accomplished through the use of light coupled, essentially pure resistive, feedback in which a d.c. reference component serves to eliminate all non-linearities in the feedback element.

It is thus an object of this invention to provide a precision solid state d.c. times a.c. multiplier.

It is another object of this invention to provide an a.c. times d.c. multiplier which is relatively inexpensive and accurate, and includes voltage controlled scaling.

It is still a further object to provide d.c. referenced light feedback in a multiplier circuit.

It is a still further object of this invention to provide an a.c. times d.c. multiplier which is particularly adapted for use as an equivalent solid state synchro differential resolver unit for aircraft use.

It is still a further object of this invention to provide a solid state relative bearing computer particularly adapted for use in aircraft navigation systems.

The above objects of the invention and other objects will be made apparent through a reading of the following description of the preferred embodiment and a study of the figures wherein.

DESCRIPTION OF THE PREFERRED EMBODIMENT

Figure 1:
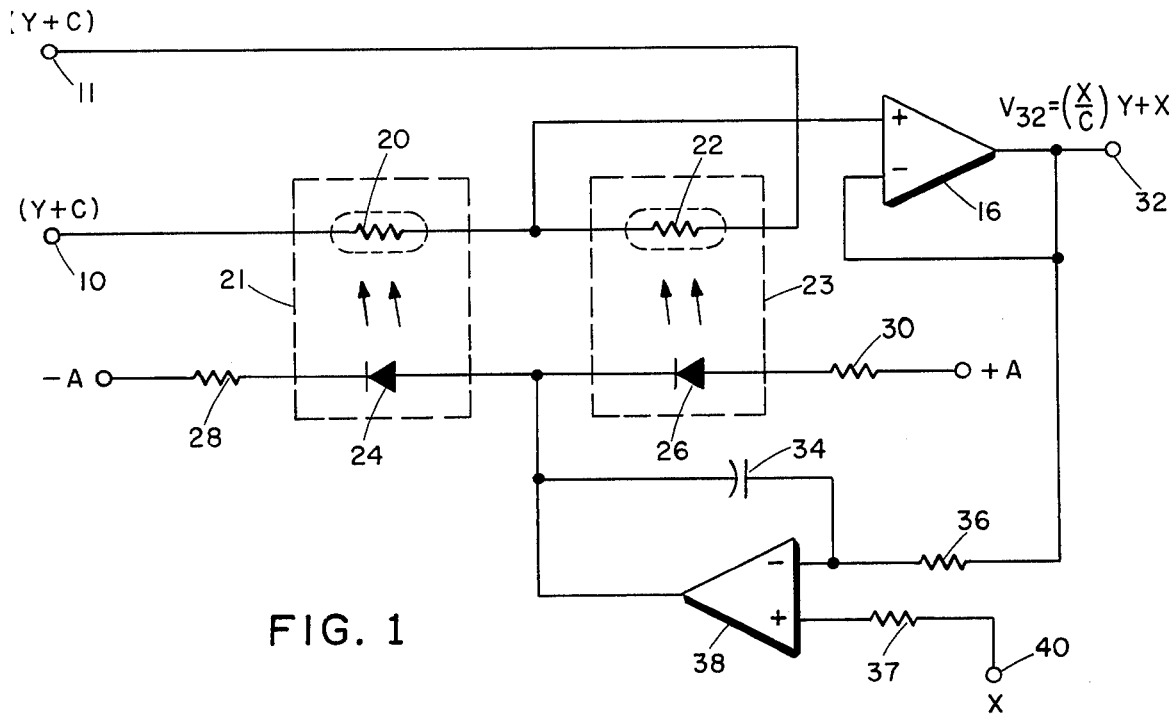
FIG. 1 is a schematic of an a.c. times d.c. multiplier.

Referring first to FIG. 1, an a.c. signal herein termed the Y signal is impressed at a terminal 10 in addition to a d.c. reference or "scaling" voltage (C) while the inverse of the Y signal and the scaling voltage is impressed at a terminal 11. The inverse signal is the signal as it might be obtained after it is processed by an inverting unity amplifier as will be shown below. Photocells 20 and 22 are serially connected between terminals 10 and 11. The photocells are suitably cadmium sulphide photocells which respond to light sources 24 and 26 which are serially connected with resistors 28 and 30 across an A+ to A— power source. Light sources 24 and 26 are suitably light emitting diodes (LED). The junction point between photocells 20 and 22 is connected to the non-inverting input terminal of operational amplifier 16 which is connected as a buffer amplifier to prevent loading of the photocell circuit. The output terminal 32 of buffer amplifier 16 is connected through a resistor 36 to the inverting input terminal of an operational amplifier 38 having a feedback capacitor 34. The non-inverting input terminal of operational amplifier 38 is connected through a resistor 37 to terminal 40, which applies the X or d.c. signal, which is to be the multiplier of the Y signal, to the circuit. The output terminal of operational amplifier 38 is connected to the common junction between light sources 24 and 26, with the signal thereat determining the relative light output of the various light sources.

In a circuit actually built, the resistances of photocells 20 and 22 were unequal to one another by about 2:1 when the output of operational amplifier 38 was at ground. This is inherent in low cost unselected photocells. They were exposed in a similar manner to their respective photocells 20 and 22 respectively within opaque enclosures 21 and 23. The output of the multiplier circuit, that is the product of XY, appears at output terminal 32. It can be seen that in this embodiment the product actually is generated at the junction of photocells 20 and 22 and must lie between Y and —Y since the photocells are connected across these signals. It can also be seen that operational amplifier 38 together with capacitor 34, resistor 36 and resistor 37 comprise, in essence, a differential integrator or low pass filter which responds only to the difference between the d.c. signal X at terminal 40 and the d.c. component of the signal at terminal 32. Accordingly, the voltage at the common junction of the light emitting sources 24 and 26 will vary their relative light output and hence the relative resistance of photocells 20 and 22, until there is no longer a difference between the d.c. voltages at terminal 32 and terminal 40. (Resistors 28 and 30 can be ordinary 5% carbon resistors which are of the same nominal value.) As a result, the output signal at terminal 32 is an a.c. signal related to the input signal Y and of the same frequency and amplitude scaled in accordance with the ratio of C to the d.c. level of the X input signal. In addition, the output signal is d.c. biased in accordance with the X input signal. This d.c. bias can generally be removed by capacitively coupling terminal 32 to a utilization circuit (not shown). In the embodiment actually built, the Y input was at a frequency of 400 Hz, of the type obtained from certain aircraft instruments.

In essence, photocells 20 and 22 together with light sources 24 and 26 comprise "feedback potentiometers" whose linearity is a function of the integrator and buffer amplifier input offsets and scaling voltage. For a buffer and integrator amplifier having two millivolt combined offset and with a scaling voltage of 4 V d.c. a total accuracy of 0.1% has been achieved. This accuracy is maintained over a —55°C to +55°C ambient temperature to the extent that the operational amplifiers retain their integrity.

The methods of applying the inverted voltages to the feedback potentiometers is critical but simple, as can be seen. Gain stability and accuracy are not critical. However, the gain of the a.c. or Y input signal must be exactly the same as the gain of the d.c. or X input signal for proper operation of the device in the mode described here. For frequencies of the a.c. input signal below about 1 KHz relatively inexpensive operational amplifiers are entirely adequate with the performance of 0.1% linearity of the circuit having been achieved without trimming the various elements employed or through the use of balance potentiometers.

Figure 2:
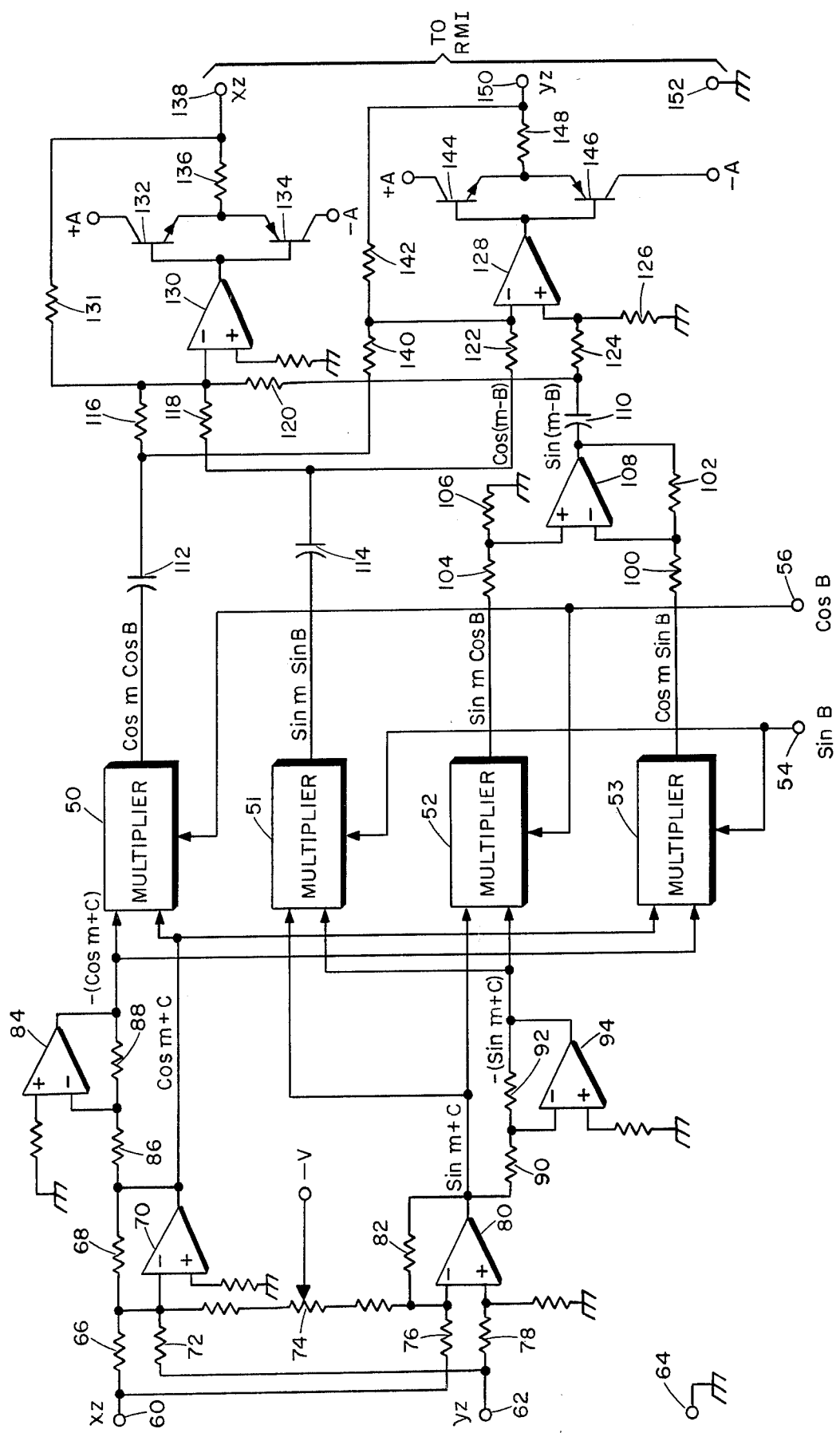
FIG. 2 is a modified block diagram of an equivalent solid state relative bearing computer using the multiplier of FIG. 1 as building blocks.

Refer now to FIG. 2 which shows how the invention can be used as an equivalent solid state relative bearing computer using the multiplier of FIG. 1 as building blocks 50, 51, 52 and 53. The magnetic compass bearing data, which is at 400 Hz, is received at terminals 60, 62 and 64. As known to those skilled in the art, magnetic compass bearing data is derived from a Y-connected synchro transformer having the $z$ connection, the connection at terminal 64, grounded. The $x$ and $y$ winding outputs, which are normally referred to as the $xz$ and the $yz$ outputs respectively, are applied at terminals 60 and 62 respectively. Also as known in the art, these signals are separated in amplitude by 60°. It is thus desirable to process these signals to standard sine and cosine components separated by 90° for this particular application. This is accomplished through the use of operational amplifiers 70 and 80 wherein terminal 62 is connected through resistor 78 to the non-inverting input terminal of operational amplifier 80 and terminal 60 is connected through resistor 76 to the inverting input terminal. A resistor 82 is arranged in feedback relationship between the output of the operational amplifier and its inverting input terminal so that the signal equivalent to sin $m$+C is generated at the operational amplifier output, where $m$ is magnetic compass bearing and C is a constant dependent upon the adjustment of potentiometer 74, as will be described. This signal is applied as an input to multipliers 51 and 52. The signal is also inverted by the inverter comprised of operational amplifier 94 and resistors 90 and 92 to produce the inverted sine signal, which is also applied as input to multipliers 51 and 52.

Terminal 62 is also resistively coupled through resistor 72 to the inverting input terminal of operational amplifier 70 as is terminal 60 which is coupled through resistor 66. Resistor 68 provides feedback between the operational amplifier output terminal and its inverting input terminal while its non-inverting input terminal is resistively connected to ground. A signal related to cos $m$ + C is thus generated at the output terminal of this operational amplifier where again the constant C is related to the adjustment of potentiometer 74 which has a winding resistively connected between the inverting input terminals of operational amplifiers 70 and 80 and a slider which provides a —V voltage to a point intermediate thereof to balance the constant term in the sine and cosine signals. The cosine output signal from operational amplifier 70 is inverted by the inverter comprised of operational amplifier 84 and resistors 86 and 88 with the cosine signal and cosine signal inverted being applied to multipliers 50 and 53, obviously corresponding to the $y$ + C and $-(y + C)$ signals of FIG. 1.

The d.c. signal to be multiplied in the various multipliers is derived from the VOR signals received at the aircraft and, as known to those skilled in the art, are d.c. signals equivalent to sine and cosine components. In this illustration, they are termed sin B and cos B are applied respectively to terminals 54 and 56 which communicate respectively with multipliers 51 and 53, and multipliers 50 and 52. The multipliers perform the desired multiplication producing as their outputs respectively the signals cos $m$ cos B at the output of multiplier 50, sin $m$ sin B at the output of multiplier 51, sin $m$ cos B at the output of multiplier 52 and cos $m$ sin B at the output of multiplier 53. The constant terms, which correspond to a constant d.c. level, are not shown here for simplicity since, as will be seen, capacitive coupling will eliminate these d.c. terms. For example, capacitors 112 and 114 at the output of multipliers 50 and 51 effectively remove the d.c. bias from these signals while capacitor 110 at the output terminal of operational amplifier 108 effectively removes any d.c. bias at that point. It should be obvious that capacitors could be provided directly at the output terminals of multipliers 52 and 53, however, in the interest of economy, the single capacitor 110 is used after the output signals from multipliers 52 and 53 have been operated upon by operational amplifier 108, whose non-inverting input terminal is connected to the output of multiplier 52 through resistor 104 and whose inverting input terminal is connected through resistor 100 to the output terminal of multiplier 53. A resistor 102 is connected in feedback relationship between the inverting input terminal and the output terminal of operational amplifier 108 while a resistor 106 is connected between the non-inverting input terminal and ground. A signal equivalent to sin ($m$-B) is generated at the output terminal of operational amplifier 108 and is applied through capacitor 110, which, as aforementioned, removes the d.c. bias, and through resistor 124 to the non-inverting input terminal of operational amplifier 128, which terminal is also connected through resistor 126 to ground. The output signal from multiplier 50 is coupled through capacitor 112 and resistor 116 to the inverting input terminal of operational amplifier 130 in the same manner as is the output signal of multiplier 51 through capacitor 114 and resistor 118. The inverting input terminal of operational amplifier 130 is coupled through resistor 120 to the output of operational amplifier 108. Resistors 116, 118 and 120 and resistor 131, which is connected in feedback relationship between the inverting terminal of operational amplifier 130 and the output terminal 138, are such that the sum of the signal outputs from multipliers 50 and 51 and operational amplifier 108 appears inverted at output terminal 138. This signal is the direct $xz$ signal which is used together with the $yz$ signal to drive the aircraft RMI. As can be seen the output terminal of operational amplifier 130 is connected to the base electrodes of the complimentary symmetry driver stage transistors 132 and 134 having commonly connected emitter electrodes connected through resistor 136 to output terminal 138 and whose collector electrodes are connected across a +A to —A voltage source. Transistors 132 and 134 are used to boost the power output capabilities of amplifier 130.

The output signals from multipliers 50 and 51 are connected respectively through resistors 140 and 122 to the inverting input terminal of operational amplifier 128. These latter resistors are arranged so that the sum of these output signals appear inverted at terminal 150 along with a non-inverted signal introduced through resistor 124. The output of amplifier 128 and its power boost transistors 144 and 146 is the above mentioned yz signal. A terminal 152 is grounded, with terminals 138, 150 and 152 comprising the input to the Y connected stator of a standard aircraft RMI wherein the symbols xz and yz designate that the z winding of the Y connected stator is grounded in a similar manner as explained with respect to the magnetic compass data input. These signals are, of course, of the type used to drive a normal RMI.

Figure 3:
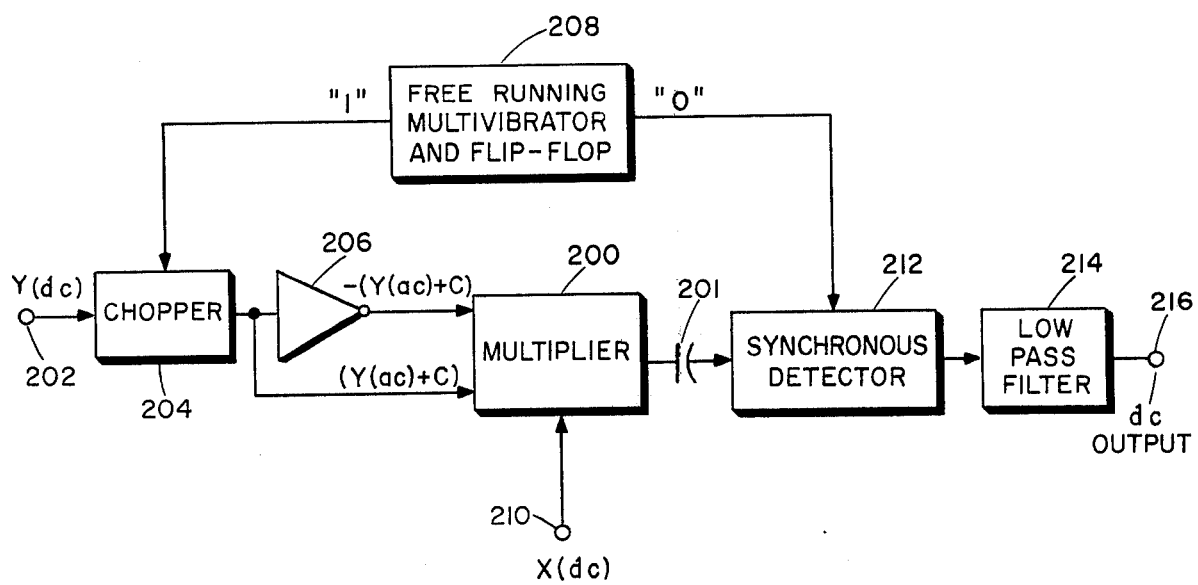
FIG. 3 is a block diagram which shows the multiplier modified for use as a d.c. times d.c. multiplier.

Refer now to FIG. 3 which shows how the basic multiplier described in FIG. 1 can be modified for use for multiplying a d.c. signal by another d.c. signal. In this embodiment a multiplier 200, essentially identical to the multiplier of FIG. 1, is seen. It is desired to generate the product of X and Y where both are d.c. signals. The Y signal is applied at terminal 202 and converted to an a.c. signal by chopper 204 with the required Y signal in a.c. form combined with a scaling d.c. voltage (C) being applied directly to multiplier 200 and the required inverted Y signal in a.c. form +C being obtained from inverter 206. The X signal in d.c. form is applied at terminal 210 directly to the multiplier. The output signal from multiplier 200 and coupled through capacitor 201 is detected by a synchronous detector 212 which is controlled together with chopper 204 by a free-running multivibrator and flip flop 208 so that the chopper and synchronous detector are operating 180° out of phase with respect to one another. The output from detector 212 is applied through low pass filter 214 to an output terminal 216 as a d.c. output signal which comprises the product of X and Y.

Having now read and understood the disclosure herein, one skilled in the art should be able to derive and develop certain obvious alterations and modifications of my invention. Accordingly, the invention is to be limited only by the true scope and spirit of the appended claims.

The invention claimed is:

1. Means for multiplying a first quantity by a second quantity wherein at least said first quantity is represented by a first d.c. signal and said second quantity is represented by an a.c. signal + a D.C. reference and the a.c. signal + the D.C. reference inverted, comprising:
 a voltage source;
 a pair of light emitting means having a common junction point and connected in series across said voltage source;
 a pair of light responsive resistive means having a common junction point and connected in series between said a.c. signal + a D.C. reference and said a.c. signal + a D.C. reference inverted;
 an output terminal upon which an output signal related to the product of said first quantity and said second quantity is generated;
 means for connecting the junction point of said pair of light responsive means to said output terminal; and,
 first means responsive to the d.c. component of siad output signal and said first d.c. signal for generating a second signal related to the difference thereof, said pair of light emitting means being responsive to said second signal whereby the ratio of light emitted by said light emitting means with respect to one another is controlled, the ratio of the resistance of said light responsive resistive means with respect to one another being controlled by said ratio of light.

2. The means for multiplying of claim 1 wherein said pair of light emitting means comprises first and second light emitting diodes and wherein said pair of light responsive resistive means comprises first and second photocells, said first photocell being exclusively exposed to light from said first light emitting diode and said second photocell being exclusively exposed to light from said second light emitting diode.

3. The means for multiplying of claim 2 wherein said first and second photocells comprise first and second cadmium sulfide photocells respectively.

4. The means for multiplying of claim 1 wherein said light emitting means comprise light emitting diodes.

5. The means for multiplying of claim 1 wherein said light responsive means comprise cadmium sulfide photocells.

6. The means for multiplying of claim 1 wherein said means for connecting comprises a unity buffer amplifier.

7. The means for multiplying of claim 1 wherein said first means comprises an operational amplifier means having first and second input ports and connected as a low pass filter, said output signal being connected to said first input port and said first d.c. signal being connected to said second input port.

8. The means for multiplying of claim 1 including a source of a second d.c. signal and additionally including:
 a free running multivibrator for generating a first frequency signal; and,
 second means responsive to said second d.c. signal and said first frequency signal for generating said a.c. signal + a D.C. reference and said a.c. signal + a D.C. reference inverted.

9. The means for multiplying of claim 8 wherein said second means comprises:
 chopper means responsive to said first frequency signal and said second d.c. signal for generating said a.c. signal; and,
 inverting means responsive to the generated a.c. signal for generating said a.c. signal inverted.

10. The means for multiplying of claim 8 wherein said free-running multivibrator additionally generates a second frequency signal displaced 180° from said first frequency signal and additionally comprising synchronous detector means responsive to said second frequency signal and the output signal at said output terminal for providing a signal correlated to the product of said first and second d.c. signals.

11. The means for multiplying of claim 10 with additionally low pass filter means responsive to said signal correlated to the product of said first and second d.c. signals for producing a d.c. signal correlated to the product of said first and second d.c. signals.

* * * * *